Patented July 28, 1953

2,647,149

UNITED STATES PATENT OFFICE 2,647,149

PRODUCTION OF OXYGEN-CONTAINING CARBON COMPOUNDS

Paul C. Condit, Berkeley, and John A. Spence, Richmond, Calif., assignors to California Research Corporation, San Francisco, Calif., a corporation of Delaware No Drawing. Application October 20, 1947, Serial No. 781,003

8 Claims. (Cl. 260—597)

1

This invention relates to the production of oxygen containing carbon compounds, for example, alcohols, aldehydes and ketones from olefinic hydrocarbons and other compounds containing the olefinic double bond, and particularly to the preparation of catalysts for facilitating such reactions.

As the organic compound to be acted upon with the carbon monoxide and hydrogen, one can use any organic compound, either gaseous, liquid or solid, which contains the so-called olefinic double bond, or a mixture of these compounds. Thus one may employ as the carbon compound an olefinic hydrocarbon such as ethylene, propylene, butylene and the other homologues of this series. One can also utilize cyclo-olefins or aralkyl compounds such as styrol, $C_6H_5.CH=CH_2$, or hydrocarbons of the terpene series, such as limonene or pinene, or products of substitution of these unsaturated hydrocarbons, for instance unsaturated alcohols, aldehydes, ketones, acids or halogen derivatives, which by condensation with carbon monoxide are converted, respectively, into keto alcohols or oxy aldehydes or di-ketones or keto-aldehydes or di-aldehydes or di-ketones or aldehydic acids or ketonic acids or halo-aldehydes, -ketones or -acids.

In another application, Serial No. 781,002 filed October 20, 1947, and now abandoned, we have described the preparation of alcohols, aldehydes, etc., from olefinic carbon compounds by reacting such compounds with carbon monoxide and hydrogen in the presence of catalysts comprising preferably the water soluble compounds of metals of group 8 of the periodic table, particularly cobalt, iron and nickel, although this invention is not limited to water soluble compounds of such metals. This reaction takes place economically at pressures of from 100 to 400 atmospheres and at temperatures of the order of 360° to 400° F.; the reaction time involved is of the order of from a few minutes to two or even four hours. We have found that in the presence of water and utilizing the water soluble compounds of group 8 metals as catalysts, the reaction between the carbon compound and the mixture of carbon monoxide and hydrogen does not take place at temperatures below about 350° F. at pressures of the order of 250 atmospheres.

When hydroxy compounds, such as alcohols, are desired from the process, the temperature range of 360° F. to 400° F. is not too objectionable. However, when it is desired to produce

2 aldehydes, for example, such higher temperatures are conducive to the formation of hydrocarbons and alcohols and the aldehyde yield is diminished. Since the aldehydes are frequently sought as such or as starting materials for manufacture of other substances, a process for preferentially producing aldehydes is desirable.

We have found that by first reacting the catalyst with carbon monoxide alone or mixed with hydrogen at an elevated temperature, e. g., 350° to 450° F., preferably 375° to 425° F., and at elevated pressures of the order of 100 to 400 atmospheres, the catalyst is preactivated and can thereafter be utilized to promote the reaction between a carbon compound containing an olefinic double bond, carbon monoxide and hydrogen to provide oxygenated products, particularly aldehydes. The reaction proceeds at a satisfactory rate at a lower temperature, e. g., between 200° and 300° F. as compared with temperatures in the range of 360° to 400° F. and which are otherwise necessary in the absence of the catalyst preactivation. At these lower temperatures the distribution of products is in favor of the aldehydes. By increasing the temperature gradually from about 200° F. as the reaction proceeds, the yield of desired products is increased; one can thus gradually increase the temperature to about 400° F. with an increase in yield of desired products, the aldehydes and alcohols.

It is an object of our invention to disclose an improved method for preparing a catalyst useful for the reaction of olefinic carbon compounds with carbon monoxide and hydrogen to produce aldehydes, alcohols, ketones, etc.

A specific object of the present invention is to provide catalysts especially prepared for facilitating reaction of the olefinic carbon compound with carbon monoxide and hydrogen under conditions favoring the preparation of aldehydes without excessive formation of by-products.

In the following description, examples are provided which clearly show the comparative results obtained by use of the earlier catalysts and the catalysts which have been preactivated in accordance with the teachings of the present invention. These are set forth by way of illustration and not as limiting the invention.

Example 1

168 grams of diisobutylene, 200 grams of distilled water and 20 grams of cobaltous acetate tetrahydrate were placed in a 2½ liter stainless steel autoclave. The autoclave was urged of air and a mixture of approximately 1 to 1 volume ratio of carbon monoxide and hydrogen was pumped into a pressure of 2,000 lbs. per square inch gauge. The autoclave was then shaken to agitate the contents and the temperature slowly raised. By checking the point at which the pressure indicated on a gauge began to fall it was noted that reaction involving the gas mixture began at approximately 356° F. The temperature was maintained between 360° and 380° F. until the reaction had substantially ceased, a period of approximately 3 hours being required. As the reaction proceeded, the mixture of carbon monoxide and hydrogen was added to maintain the pressure at approximately 3,000 lbs. per square inch. The product of this reaction was a two-layered liquid system. The major portion of the organic layer was determined to be a mixture consisting of 70–75% by weight of nonyl alcohol, 5% of aldehydes, 20–25% isooctane, and a very small quantity of higher boiling by-products.

Example 2

200 milliliters of 9.1% cobaltous acetate solution in water were placed in the autoclave and shaken and a 1 to 1 volume ratio of carbon monoxide and hydrogen charged to a pressure of 2,000 lbs. per square inch. The autoclave was then heated to approximately 400° F., the pressure rising proportionately; the temperature and pressure were maintained for two hours. The reaction mixture was then cooled to 70° F. and 168 grams of diisobutylene were pumped into the autoclave. The pressure within the autoclave was then adjusted to 2,000 lbs. per square inch. On raising the temperature, it was found that reaction between the diisobutylene and the gas mixture commenced at 225° F. The reaction was completed over a period of three hours, during which time the temperature did not exceed 300° F. The product analyzed 75% by weight aldehyde, 14% isooctane, 2% diisobutylene with the remainder alcohols and a small quantity of thick oily bottoms.

The treatment of the catalyst of Example 2, which we regard as preactivation, is shown to be responsible for an appreciable decrease in the temperature at which the reaction between the olefin and the gas mixture may be initiated, in the absence of preactivation as in Example 1. This is of advantage where it is desired to avoid the higher temperatures necessary in the earlier processes, as in the production of aldehydes, rather than the alcohols. By such preactivation of the catalyst, the process may be made to take place at temperatures which do not favor the condensation or reduction of the aldehydes produced.

An equally important advantage obtains, however, even where the desired product is an alcohol. In this case the reaction apparently takes place in two steps, viz., the initial formation of an aldehyde which is later converted to the alcohol. Accompanying the formation of the aldehyde, however, is a direct production of a saturated hydrocarbon which generally constitutes an unwanted byproduct of the process. Since the lower temperature possible with the preactivated catalyst favors the production of aldehyde at the expense of the hydrocarbon, recovery of alcohol from such a process is improved. The process of this invention, therefore, makes it possible to carry on the reaction first at a lower temperature to produce the aldehyde, and then at a higher temperature to convert the aldehyde into alcohols with a higher over-all yield of the desired product. By operating in this fashion, we have found that we are able to reduce the percentages of saturated hydrocarbons produced from around 20% to around 13% with a corresponding gain in the yield of alcohol.

The various water soluble compounds of metals of group 8 may be preactivated under other and different pressures and temperatures from those set forth in Example 2. We have found that the preactivation process is applicable generally to compounds of cobalt, iron, and nickel, irrespective of the water solubility thereof.

The metal salt may also be preactivated by reaction with carbon monoxide alone, as indicated by the results from Example 3 below:

Example 3

A solution of 20 g. of cobalt acetate tetrahydrate in 100 ml. of water was charged to an autoclave and carbon monoxide compressed in until the pressure was 2,000 lb. per square inch. The autoclave was agitated and the temperature raised to 400° F. This condition was maintained for 100 minutes and the mixture then allowed to cool under pressure.

When cool, the autoclave was opened and 168 g. of diisobutylene added. It was then sealed again and purged with a 1:1 mixture of carbon monoxide and hydrogen. It was pressured to 2,000 lbs. per square inch with the same gas mixture and heating and agitation commenced. The pressure increased with temperature up to 254° F. at which point reaction commenced as indicated by a drop in pressure.

The temperature was raised to 400° F. over an additional period of 200 minutes, and the contents of the autoclave discharged through a water-jacketed cooler. The organic layer was separated from the aqueous layer and dried. It was found to have a Hydroxyl No. of 244 and a Carbonyl No. of 14.5. On rectification 12.5% of issoctane and 69.5% of nonyl alcohol were isolated.

Further, metal compounds not substantially water soluble may be preactivated to constitute good catalysts.

Example 4

A mixture of 20 g. of cobalt napthenate and 100 ml. of water was charged to an autoclave and carbon monoxide pumped in up to a pressure of 2,000 lbs. per square inch. The autoclave was heated and the temperature raised to 400° F. and maintained there for 120 minutes. When the autoclave had cooled, 168 g. of diisobutylene was added and the mixture treated as in Example 3. Reaction commenced at 245° F. A previous run had shown that if the preactivation was omitted, a temperature of 327° F. was required to initiate reaction with the cobalt naphthenate catalyst. The reaction mixture was raised to 400° F. over an additional 160 minutes. The product was worked up in the customary fashion and found to have a Hydroxyl No. of 91 and a Carbonyl No. of 31.6. This corresponds to an alcohol content of 23% and an aldehyde content of 8% calculated as the $C_9$ compounds.

Finally, the oil-soluble compound may be preactivated in absence of water.

Example 5

A mixture of 20 g. of cobalt naphthenate and 100 ml. of isooctane was treated with carbon monoxide at 400° F. exactly as in Example 4. The autoclave was cooled and 168 g. of diisobutylene and 100 ml. of water added. The mixture was treated with a 1:1 mixture of carbon monoxide and hydrogen as before. Reaction commenced at 233° F. The temperature was raised to 373° F. over an additional 240 minutes. The organic product was isolated and found to possess a Hydroxyl No. of 184 and a Carbonyl No. of 23.5. This corresponds to an alcohol content of 47% and an aldehyde content of 6% calculated as the $C_9$ compounds.

We claim:

1. The process for preparing a catalyst capable of catalyzing the reaction of an olefinic carbon compound with carbon monoxide and hydrogen at temperatures below about 300° F. comprising reacting, in the presence of water, a compound of a metal from the group consisting of cobalt, iron, and nickel with carbon monoxide at from 100 to 400 atmospheres pressure and from 350° to 450° F.

2. The process comprising reacting a water solution of a cobalt salt with carbon monoxide at 100 to 400 atmospheres pressure and from 350° to 450° F.

3. The process comprising reacting a water solution of a cobalt salt with carbon monoxide at 100 to 400 atmospheres pressure and from 375° F. to 425° F.

4. The process for reacting an olefinic carbon compound with carbon monoxide and hydrogen comprising reacting a water solution of a compound of a metal from the group consisting of cobalt, iron, and nickel with carbon monoxide and hydrogen at from 100 to 400 atmospheres pressure and from 350° to 450° F. and then reacting a carbon compound containing an olefinic double bond with carbon monoxide and hydrogen in the presence of the resultant water solution at a temperature below about 300° F.

5. A process for producing an oxygenated carbon compound from a carbon compound containing an olefinic double bond comprising a first step of reacting a compound of a metal from the group consisting of cobalt, iron, and nickel with carbon monoxide at from 100 to 400 atmospheres pressure and from 350° to 450° F., and a second step of reacting the carbon compound with carbon monoxide and hydrogen at from 100 to 250 atmospheres pressure and at a temperature from 200° to 300° F. in the presence of water and the reaction product of the first step.

6. A process as in claim 5 wherein the temperature employed in reacting the carbon compound with carbon monoxide and hydrogen is increased in the course of the reaction from 200 to 300° F. in the first and major part of the reaction period to about 400° F. during the latter minor portion of the reaction period.

7. The process for reacting an olefinic carbon compound with carbon monoxide and hydrogen at temperatures below about 300° F. which comprises reacting a solution consisting essentially of water and a water-soluble compound of a metal selected from the group consisting of cobalt, iron, and nickel with carbon monoxide and hydrogen at a pressure in the range from 100 to 400 atmospheres and at a temperature in the range 350° to 450° F. and then reacting a carbon compound containing an olefinic double bond with carbon monoxide and hydrogen in the presence of said solution at a temperature in the range 200 to 300° F.

8. The process for preparing a catalyst capable of catalyzing the reaction of an olefinic carbon compound with carbon monoxide and hydrogen at temperatures below about 300° F. which comprises intimately contacting carbon monoxide with a solution consisting essentially of water and a water-soluble compound of a metal selected from the group consisting of cobalt, iron, and nickel at a pressure from about 100 to about 400 atmospheres and at a temperature in the range about 350° to 450° F.

PAUL C. CONDIT.
JOHN A. SPENCE.

References Cited in the file of this patent

UNITED STATES PATENTS

| Number | Name | Date |
|---|---|---|
| 1,973,662 | Schalch | Sept. 11, 1934 |
| 2,088,997 | Max | Aug. 3, 1937 |
| 2,378,053 | Wallis et al. | June 12, 1945 |
| 2,437,600 | Gresham et al. | Mar. 9, 1948 |
| 2,473,995 | Gresham et al. | June 21, 1949 |

OTHER REFERENCES

"Interrogation of Dr. Otto Roelen," by C. C. Hall et al., B. I. O. S. Final Report 447, by Office of Technical Services, Dept. of Commerce, Washington, D. C., reprinted by Hobart Publishing Co., Box 4127, Chevy Chase Br., Washington 15, D. C., pages 45 and 46.

Fernelius: "Inorganic Synthesis," vol. II, pages 230–231, pub. by McGraw-Hill Book Co., New York, N. Y. (1946).

Journal of the American Chemical Society, vol. 62 (1940), pages 1192 and 1193 (article by Blanchard and Gilmont).

Technical Oil Mission, Reel 36, Item 21, Bag No. 3452, CIOS Target No. 30/5.01. Ruhrchemie A. G. Sterkrade-Holten, German application O. Z. 13,366 to I. G. F., pages 3–6 inclusive. Deposited in Library of Congress April 18, 1946.